(12) United States Patent
Karlsson et al.

(10) Patent No.: US 9,832,969 B2
(45) Date of Patent: Dec. 5, 2017

(54) DOCKING DEVICE FOR A ROTARY MILKING PARLOUR

(71) Applicant: DELAVAL HOLDING AB, Tumba (SE)

(72) Inventors: Sandra Karlsson, Tumba (SE); Andre Nowicki, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 182 days.

(21) Appl. No.: 14/908,569

(22) PCT Filed: Jul. 28, 2014

(86) PCT No.: PCT/SE2014/050908
§ 371 (c)(1),
(2) Date: Jan. 29, 2016

(87) PCT Pub. No.: WO2015/016766
PCT Pub. Date: Feb. 5, 2015

(65) Prior Publication Data
US 2016/0157460 A1  Jun. 9, 2016

(30) Foreign Application Priority Data
Jul. 31, 2013  (SE) .................................... 1350922-9

(51) Int. Cl.
*A01J 5/00* (2006.01)
*A01K 1/12* (2006.01)
(Continued)

(52) U.S. Cl.
CPC ............... *A01K 1/126* (2013.01); *A01J 5/013* (2013.01); *A01J 5/044* (2013.01)

(58) Field of Classification Search
CPC ............ A01K 1/126; A01K 1/12; A01J 5/004
See application file for complete search history.

(56) References Cited

U.S. PATENT DOCUMENTS 1,787,152 A  12/1930 Hapgood
1,959,716 A  5/1934 Hapgood
(Continued)

FOREIGN PATENT DOCUMENTS

CA  2484478 A1 *  4/2005  .............. A01J 5/017
CA  2484706 A1 *  4/2005  .............. A01J 5/017
(Continued)

OTHER PUBLICATIONS

International-Type Search Report, dated Mar. 4, 2014, from corresponding PCT application.
(Continued)

*Primary Examiner* — Kristen C Hayes
(74) *Attorney, Agent, or Firm* — Young & Thompson

(57) ABSTRACT

A docking device, for a milking parlor with a rotary platform and a plurality of milking stalls, includes a first docking unit with a part of a first milk line connected to the platform and a second docking unit with a part of a second milk line separately arranged from the platform. At least one of the docking units includes an adjusting mechanism allowing an adjustment of a position of said docking unit in relation to the other docking unit. At least one of the docking units is associated with a guiding surface configured to guide the other docking unit during the movement in order to reach the docking position in which a closed connection is provided between the outlet opening of the first docking unit and the inlet opening of the second docking unit.

17 Claims, 5 Drawing Sheets

(51) Int. Cl.
*A01J 5/013* (2006.01)
*A01J 5/04* (2006.01)

(56) References Cited

U.S. PATENT DOCUMENTS

| | | | | |
|---|---|---|---|---|
| 3,999,517 A | * | 12/1976 | Andersson | A01K 1/126 119/14.04 |
| 4,145,992 A | | 3/1979 | Rafaely | |
| 6,105,536 A | * | 8/2000 | DeWaard | A01J 5/0175 119/14.04 |
| 2012/0012060 A1 | | 1/2012 | Eriksson | |

FOREIGN PATENT DOCUMENTS

| | | | | |
|---|---|---|---|---|
| CA | 2757077 A1 | * | 10/2010 | A01J 7/025 |
| SE | 385 431 B | | 3/1976 | |
| SU | 286396 A | | 1/1971 | |
| SU | 791347 A | | 12/1980 | |
| SU | 791348 A | | 12/1980 | |
| SU | 1477334 A1 | | 5/1989 | |
| WO | 00/74472 A1 | | 12/2000 | |

OTHER PUBLICATIONS

International Search Report, dated Nov. 6, 2014, from corresponding PCT application.
Supplementary International Search Report, dated Oct. 30, 2015, from corresponding PCT application.

* cited by examiner

DOCKING DEVICE FOR A ROTARY MILKING PARLOUR

BACKGROUND OF THE INVENTION AND PRIOR ART

The present invention relates to a docking device of a milking parlour comprising a rotary platform with a plurality of milking stall, wherein each milking stall comprises a first milk line connected to the platform and configured to receive milk from animals milked in the milking stall and a second milk line arranged separately from the platform, wherein the docking device comprises a first docking unit comprising an outlet opening of the first milk line and a second docking unit comprising an inlet opening of the second milk line, wherein one of the first docking unit and the second docking unit is configured to be moved towards the other docking unit and to reach a docking position when the respective milking stall on the rotary platform arrives at a specific rotary position.

On regular time basis, a sample of the milk from individual milking animals in a herd is taken. A milk sample may, for example, be taken once a day. The milk sampling process may be performed in connection with a milking process of the animals in a rotary milking parlour. In this case, a milk sampling apparatus is manually connected to a milk conduit in the respective milking stalls in proper order during a milk sampling process of the animals in a herd. The milk sampling apparatus may be provided with a fixed or removable rack supporting milk sampling tubes. The milk sampling apparatus may comprise a filling member capable of filling the respective sampling tubes with milk from the individual animals in the herd. When all milk sampling tubes are filled they are sent to the laboratory for analysis, in which various parameters such as contents of fat, protein, somatic cells and urea are examined.

WO 00/74472 shows a device and a method for transfer of milk from milking stalls on a rotary parlour. The milk from a milking process in a milking stall is initially collected in a local milking vessel. The milking stall rotates to a position in which an outlet of the milking vessel reaches a position vertically above a funnel of the common milk collector. The funnel is raised to a position at a small distance below the outlet. A shut off valve is open and milk flows from the local milking vessel, via the funnel, to a collection vessel. The amount of milk may be measured and the quality of the milk determined in a collection vessel. In this case, the milk comes in contact with surrounding air in the funnel. There is here a risk that the milk will be contaminated.

SUMMARY OF THE INVENTION

The object of the present invention is to provide a docking device forming a closed milk passage for automatic transfer of milk from milk lines in a milking stall on a rotary platform of a milking parlour to a milk line arranged separately from the platform.

This object is obtained according to the invention by the feature that at least one of the docking units comprises an adjusting mechanism allowing an adjustment of the position of said docking unit in relation to the other docking unit and wherein at least one of the docking units is associated with a guiding surface configured to guide the other docking unit during the movement in order to reach the docking position in which a closed connection is provided between the outlet opening of the first docking unit and the inlet opening of the second docking unit.

The rotary position of the platform may be controlled within a margin of error which may be in the order of 1 to 2 cm. However, in order to form a closed connection, the docking units needs to be positioned with a higher accuracy in relation to each other. When a milking stall arrives at the specific rotary position, one of the docking units achieves a movement in a direction towards the other docking unit. The docking units usually come in contact with each other in an initial contact position. Due to the above mentioned margin of error, the initial contact position corresponds typically not to the docking position. The following motion of the docking units towards each other results in an adjustment of the position of the docking units in relation to each other by means of the adjusting mechanism and the guiding surface. Thereby, the docking units are in the most cases moved to the docking position from an initial contact position. In the docking position, it is possible to transfer milk from the first milk line to the second milk line via a closed connection between the milk lines.

According to an embodiment of the invention, said the first docking unit and the second docking unit comprises complementary shaped contact surfaces in the docking position forming the closed connection between the inlet opening and the outlet opening. One of the docking units may, for example, have a convex contact surface and the other docking unit a complimentary shaped concave contact surface. At least one of the contact surfaces may have elastic properties in order to further guarantee closed connection between the contact surfaces. Alternatively, at least one of the docking units may comprise a contact surface with the other docking unit in the docking position formed by a sealing member. Such a sealing member may be an O-ring arranged around the opening of said docket unit.

According to an embodiment of the invention, said movable docking units is configured to provide a substantially vertical movement towards the other docking unit. Preferably, the docking units are arranged in different height levels when they arrive to the specific rotary position. Thus, one of the docking units is substantially arranged vertically above the other docking unit when the docking process starts. During the docking process, one of the docking units is moved in a vertical direction upwards or downwards to a docking position with the other docking unit.

According to a preferred embodiment of the invention, said movable docking units are configured to provide a movement towards the other docking unit by means of an extensible power member. Such an extensible power member may be a hydraulic cylinder or a pneumatic cylinder. Preferably, the extensible power member is configured to provide a movement of the second docking unit of the second milk line towards the first docking unit. In most cases, the docking device comprises one second docking unit and a large number of first docking units which are docked to the only second docking unit in proper order when the respective milking stall arrives at the specific rotary position. Consequently, it is enough with one extensible power member which provides a docking movement of the second docking unit. In other case, an extensible power member is to be arranged in connection to each one of the first docking units. It is of course possible to use other mechanisms than extensible power members for moving the docking units towards each other. A movable docking unit may, for example, comprise a contact surface or a rolling member configured to come in contact with a control surface of a rail unit or the like which provide a movement of the docking unit towards the other docking unit when a milking stall arrives to the specific rotary position.

If the platform is driven intermittently, it may be stopped during the transfer of milk from the first milk line to the second milk line. In this case, the second docking unit may be stationary arranged at the outside of the platform. If the platform is driven continuously, it will rotate during the transfer of milk from the first milk line to the second milk line. In this case, the second docking unit may be movably arranged on a rail or the like such that it moves together with the platform after it has been docked with a first docking unit.

According to a further embodiment of the invention, said guiding surface comprises a conically shaped surface. A conically shaped surface allows guiding of a docking unit from an initial contact position to a center point of the conically shaped guiding surface. The radius of the conical shaped surface is dimensioned such that it is larger than the margin of error of the platform when it has arrived at a specific rotary position. Thereby, it is guaranteed that the docking units always will come in contact to each other. Said docking unit associated with the guiding surface may be a funnel-shaped docking unit. A funnel-shaped docking unit has a conically guiding surface. The docking unit may be a funnel-shaped docking unit having the opening in a center point of the guiding surface. The funnel-shaped docking unit may be manufactured by a suitable plastic material or a metal material. The docking unit associated with the guiding surface is associated with the first milk line on the platform. Alternatively, it is associated with the second milk line separate from the platform.

According to a further embodiment of the invention, said adjusting mechanism comprises spring member. The position of the opening of the docking unit may be adjusted by the guiding surface during the movement of the docking unit from the initial contact position to the docking position against the action of the spring member. Preferably, said spring member allows an adjustable positioning of the opening of the docking unit in arbitrary direction from an initial basic position. Such an adjustability of the docking unit makes it possible for the docking unit to be adjusted to a correct docking position with the other docking unit from a substantially arbitrary initial contact position. Furthermore, such an adjustability makes it possible for the adjustable docking unit to be pressed against the other docking unit in the docking position with a spring force which further facilitate the establishment of a tight connection between the docking units in the docking position.

According to a further embodiment of the invention, the spring member is a coil spring arranged around a tubular portion of the docking unit. A spring coil which is mounted around a tubular portion of the adjustable docking unit allows a movement of the docking unit in a transverse plane. The ends of the coil spring may be arranged between a contact surface of the docking unit and a contact surface a mounting member. In this case, the coil spring also allows a movement of the docking unit in a longitudinal direction.

According to a further embodiment of the invention, the mounting member comprises a first bracket with a through hole for the docking unit, wherein the through hole in the first bracket has a larger diameter than the diameter of the tubular portion of the docking unit. Such a through hole allows a movement of the docking unit in a transverse plane up to a maximum distance from an initial basic position defined by the radius of the through hole.

According to a further embodiment of the invention, the docking unit may be provided with an annular flange having a larger diameter than the through hole in the first bracket. Such an annular flange maintains the docking unit in a predetermined position in the relation to the first bracket. The annular flange may have a curved surface to be in contact with the first bracket in the vicinity of the through hole such that the docking unit is allowed to pivot around a pivot point in the vicinity of the annular flange. An annular flange with a curved contact surface with the bracket may work as a ball joint. The mounting member may comprise a second bracket with a mounting hole for a milk line connected to an end portion of the docking unit in a space between the first bracket and the second bracket. The coil spring may be arranged between the docking unit and the milk line in the space between the first bracket and the second bracket.

According to a further embodiment of the invention, one of the docking units may have the opening at a free end portion. Such a docking unit may be shaped as a tube with a substantially constant cross section area along its entire length. A docking unit having an opening at a free end portion may relatively easy be docked to a funnel-shaped docking unit having the opening in a center point of its conically-shaped guiding surface. The free end portion of the docking unit may be formed with a convex surface in the vicinity of the opening. Such a free end portion has no edges or irregularities. Thus, the risk the free end portion of the docking unit gets caught on the guiding surface during the movement from an initial contact position to the docking position is substantially eliminated.

According to a further embodiment of the invention, the docking device is configured to transfer a milk sample from an animal in the milking stall, via the first milk line and the second milk line, to a milk sampling apparatus arranged separately from the platform. In this case, it is possible to transfer a milk sample in proper order from individual animals when the milking stalls arrive at the specific rotary position.

BRIEF DESCRIPTION OF THE DRAWINGS

In the following, preferred embodiments of the invention are described by examples and with references to the attached drawings, in which.

BRIEF DESCRIPTION OF PREFERRED
EMBODIMENTS OF THE INVENTION

Figure 1:
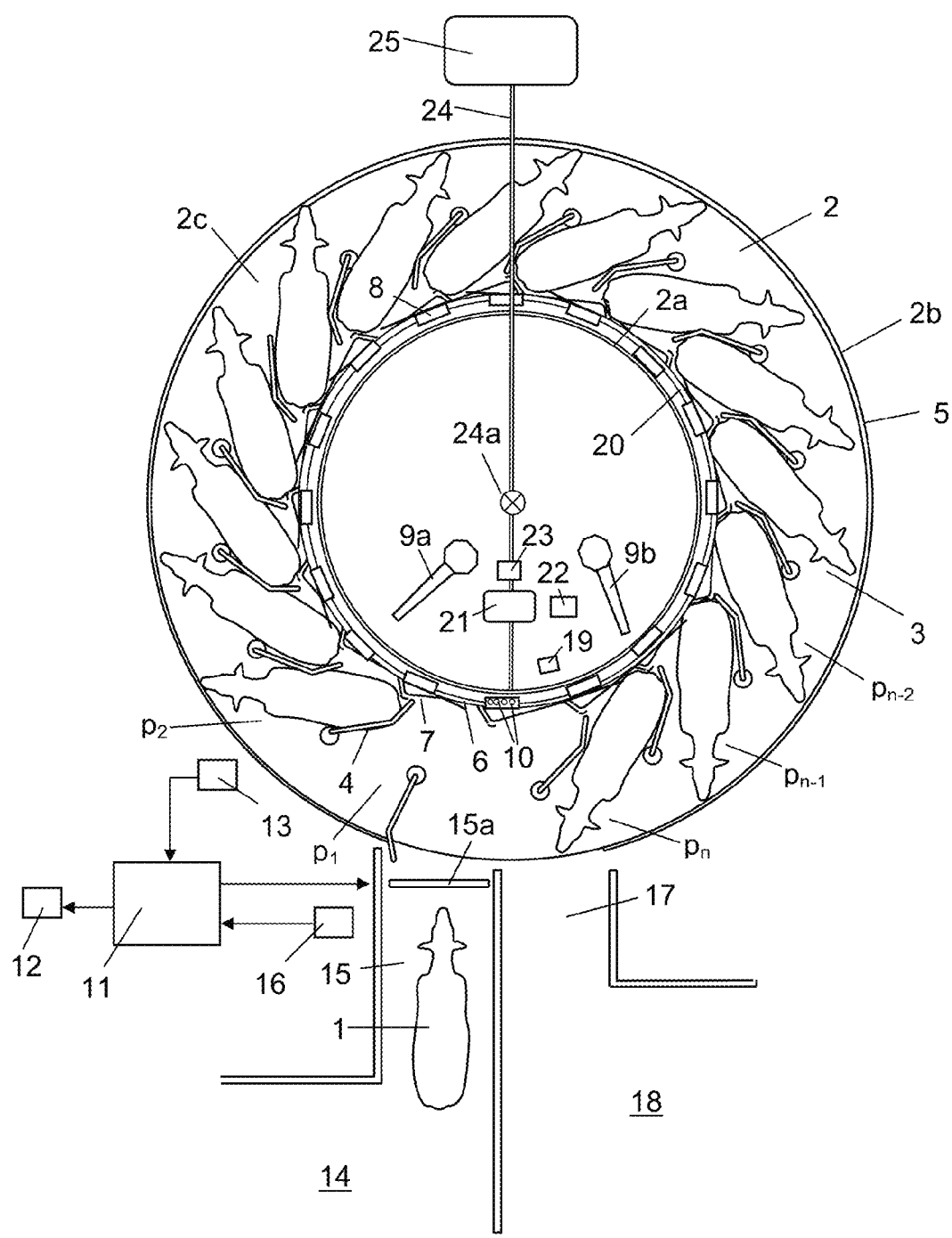
FIG. 1 shows a rotary milking parlour with a docking device according to the invention.

FIG. 1 shows a rotary milking parlour for milking of cows 1. The rotary milking parlour comprises an annular platform 2 having an inner edge portion 2a and an outer edge portion 2b. The platform 2 rotates during operation around a vertical axis. The platform 2 has an upper surface 2c forming a support surface for the cows 1. A plurality of rotatable fence members 4 are arranged on the upper surface 2c of the platform 2. The rotatable fence members 4 are here used for dividing the platform 2 into milking stalls 3 for receiving individual cows 1 in predetermined milking positions. By the use of rotatable fence members 4, it is possible to position the cows 1 very close together on the platform 2. An outer fence arrangement 5 is mounted around a common part of the outer periphery of the platform 2. An inner fence arrangement 6 and a rumprail 7 are arranged at the inner edge portion 2a of the platform 2. The object of the rumprail 7 is to position the rear part of the cows 1 in a predetermined milking position in the milking stalls 3. In this milking parlour, the cows 1 are arranged in a herringbone pattern with the heads at the outer edge portion 2b of the platform 2.

A first robot arm 9a is arranged in a position inside the inner edge portion 2a of the platform 2. The object of the first robot arm 9a is to attach teat cups 10 to the teats of the cows 1 in the milking stalls 3. Each milking stall 3 comprises a teat cup magazine 8 adapted to hold four teat cups 10 in a parked position when they are not used. Teat cup magazines 8 are arranged at the inner edge 2a of the platform 2. In this case, the teat cup magazines 8 are arranged on one side of a cow 1 in a milking stall 3 and behind a cow 1 standing in an adjacent milking stall 3. When the cows 1 are arranged in a herringbone pattern on a platform 2, the above-mentioned space is normally empty. Therefore, it is very suitable to use this space for the teat cup magazines 8. A second robot arm 9b is arranged in a position inside the inner edge portion 2a of the platform 2. The object of the second robot arm 9b is to perform a treatment of the teats of the cows 1 when a milking process has been finished. A milk sampling apparatus 19 is arranged in a position inside the inner edge portion of the platform 2.

A control unit 11 controls a schematically shown drive mechanism 12 for driving of the platform 2. A position sensor 13 senses the rotational position of the platform 2 and sends a signal to the control unit 11 about the actual position of the platform 2. A waiting area 14 is arranged in connection to the platform 2. The waiting area 14 has an entrance passage 15 to the platform 2. An entrance gate 15a is arranged in a front position of the entrance passage 15. An identification sensor 16 is arranged at the entrance passage 15. An exit passage 17 is arranged in the vicinity of the entrance passage 15. The exit passage 17 leads to an exit area 18.

A circular milk line 20 receives milk from all milking stalls 3 on the platform 2. The common milk line 20 is connected to the platform 2 and it is arranged in a position below the upper surface 2c of the platform 2. The common milk line 20 conducts the milk to a common receiver 21. A schematically disclosed vacuum source 22 is connected to the common receiver 28. The vacuum source 22 sucks milk in the common milk line 20 to the common receiver 21. A pump 23 is arranged in connection to the common receiver 21. The object of the pump 23 is to pump the milk from the common receiver 21, via a common milk line 24, to a common milk tank 25 arranged at the outside of the platform 2. The common milk 24 line runs through a swivel 24a arranged at the vertical rotation axis of the platform 2.

Figure 2:
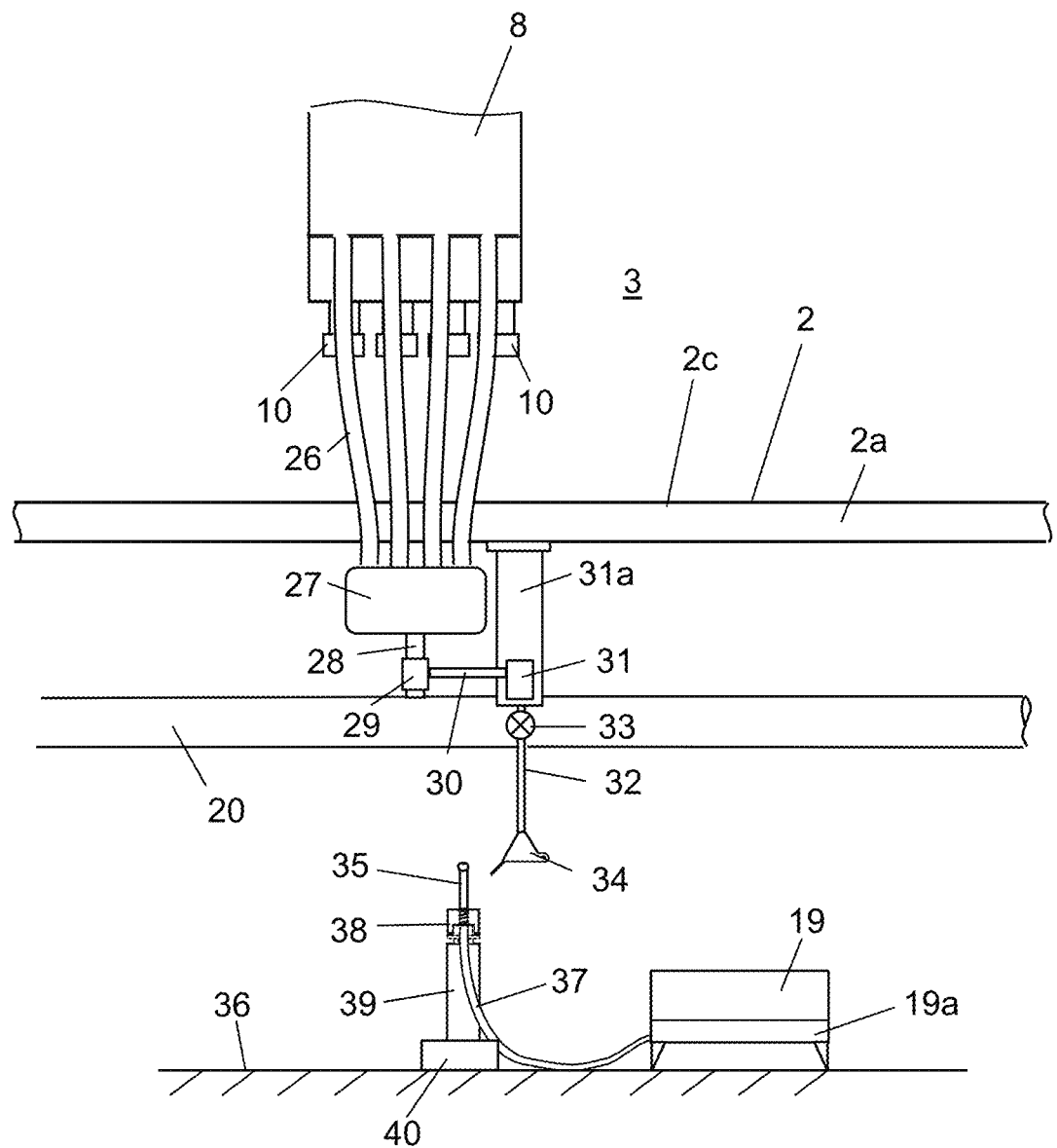
FIG. 2 shows one of the milking stalls in FIG. 1 and the docking device from a position inside of the platform.

FIG. 2 shows one of the milking stalls 3 in FIG. 1 in a view from the inside of the annular platform 2. In this case, there is no cow 1 in the milking stall 3 and the teat cups 10 are in a parked position in the teat cup magazine 8. During a milking process in the milking stall 3, the four cups 10 are attached to a respective teat of a cow 1 in the milking stall 3. The milk from the respective teats flows from the teat cups 10 and a respective milk tube 26 to a milk meter 27. The milk meter 27 measures the milk flow in the respective milk tubes 26. The milk flows from the milk meter 27, via a local milk line 28 to the common circular milk line 20. The local milk line 28 comprises a milk sampling member 29 configured to cut out a relevant milk sample from the milk flow in the local milk line 28 during a milking process. The milk sample is directed, via a milk sample line 30, to a milk sample container 31. The milk sample container 31 is connected, via an outlet line 32 and a valve member 33, to a first docking unit in the form of a funnel-shaped docking unit 34. The milk sample line 30, the milk sample container 31, the outlet line 32, the valve member 33 and the first docking unit 34 forms a first milk line which is attached on the platform. In this case, the milk sampling container 31 and associated milk lines are fixedly attached to the platform 2 by means of a mounting beam 31.

The milk sampling apparatus 19 is arranged on a floor surface 36 at the side of the platform 2. The milk sampling apparatus 19 may be a box or the like. In this case, the milk sampling apparatus 19 is arranged on a support structure 19a such that it obtains a position above the floor surface 36. The milk sampling apparatus 19 containing a not visible rack with a plurality of sampling tubes and a filling member filling the respective tubes with milk from individual cows. When all milk sampling tubes are filled, the milk sampling apparatus is sent as a unit to a laboratory for analysis of the milk samples.

A second docking unit in the form of a tubular docking unit 35 is configured to come in contact with the funnel-shaped docking unit 34 when the platform arrives at a specified rotary position. The tubular docking unit 35 is connected to the milk sampling apparatus via a milk line 37. The tubular docking unit 35 is resiliently mounted by means of an adjusting mechanism 38. The adjusting mechanism 38 is arranged on an upper part of an extensible power member 39. The extensible power member 39 is arranged on a support member 40 mounted on the floor surface 36. The tubular docking unit 35 and the milk line 37 forms a second milk line which is separate from the platform 2.

Batch milking is practised in this milking parlour. A herd of cows 1 to be milked are moved to the waiting area 14. In this case, a milk sample from all individual cows 1 in the herd is to be taken. In the waiting area 14, the cows 1 may have possibility to eat concentrated food before walking to the entrance passage 15 leading to the rotary platform 2. The cows 1 in the herd walks in proper order to the enter passage 15. The entrance passage 15 has a width such that only one cow 1 at a time can be located in a front position of the passage 15. The entrance gate 15a is in a closed position when a cow 1 arrives to the front position of the entrance passage 15. The cow 1 carries a transponder containing data about the individual cow 1. The identification sensor 16 reads the transponder and sends a signal to the control unit 11 about the identity of the cow. The control unit 11 receives substantially continuously information from the position sensor 13 about the actual rotational position of the platform 2. When a milking stall 3 arrives to a first rotational position $p_1$, just in front of the entrance gate 15a, the control unit 11 controls the drive mechanism 12 such that the platform is temporarily stopped and the entrance gate 15a is moved to an open position.

The control unit 11 has access to information about the individual cows 1 in a herd. The control unit 11 stores information about the identity of the cow 1 and the milking stall 3 used by the cow 1. When the control unit 11 opens the entrance gate 15a, the cow 1 enters the milking stall 3. The entrance gate 15a is moved to its closed position as soon as the whole cow 1 is on the platform 2. The control unit 11 controls the drive mechanism such the platform 2 starts when the entrance gate 15a has been closed. The cow 1 walks around the pivot of the fence member 4 and enters a milking stall 3 on the platform. The fence member 4 is moved to a position in contact with the cow 1 by means of a not shown control member.

The control unit 11 activates the first robot arm 9a such that it fetches the teat cups 10 from the teat cup magazine 8 and attaches them to the cow 1 when the milking stall 3 has reached a second rotational position $p_2$. The platform 2 is driven with a slow speed such that it is no problem for the first robot arm 9 to compensate for the relative motions between the cow 1 on the platform 2 and the robot arm 9 during the attaching process of teat cups 7 to the cow 1. The milking process of the cow 1 starts when all teat cups 10 have been attached to the cow 1. The milk meter 27 supervises the milk flow during the milking process. The control unit 11 receives information about the milk flow from the milk meter 27. The milk sampling member 29 cuts out a relevant milk sample of the milk flow in the local milk line 28. The milk sample is collected in the milk sample container 31. The valve member 33 is closed such the milk sample is maintained in the milk sample container 31 during the milking process.

As soon as the milk flow drops below a predetermined value, a removing device, which is arranged in the teat cup magazine 8, removes the teat 10 from the teats of the cow 1. During a milking process, the teat cups 10 are at least removed when the milking stall 3 arrives to a third last rotational position $p_{n-2}$. In the second last rotational position $p_{n-1}$, the second robot arm 9b performs a treatment of the teats of the cow 1. The second robot arm 9b may support a spraying device and spray a disinfecting medium or another kind of treatment medium to the teats of the cow 1. Finally, when the milking stall 3 reaches a last rotational position $p_n$. The control unit 11 controls the drive mechanism 12 such that the platform 2 is stopped. The cow 1 leaves the milking stall 3 and enters the exit passage 17. Thereafter, the control unit 11 controls the driving mechanism such that the platform 2 starts and the milking stall 3 again will be rotated to the first rotational position $p_1$ and be ready to receive a new cow 1. The milk sampling apparatus 19 is arranged in a specific rotation position of the milking stall 3. The specific rotation position may corresponds to the last rotational position $p_n$.

Figure 3:
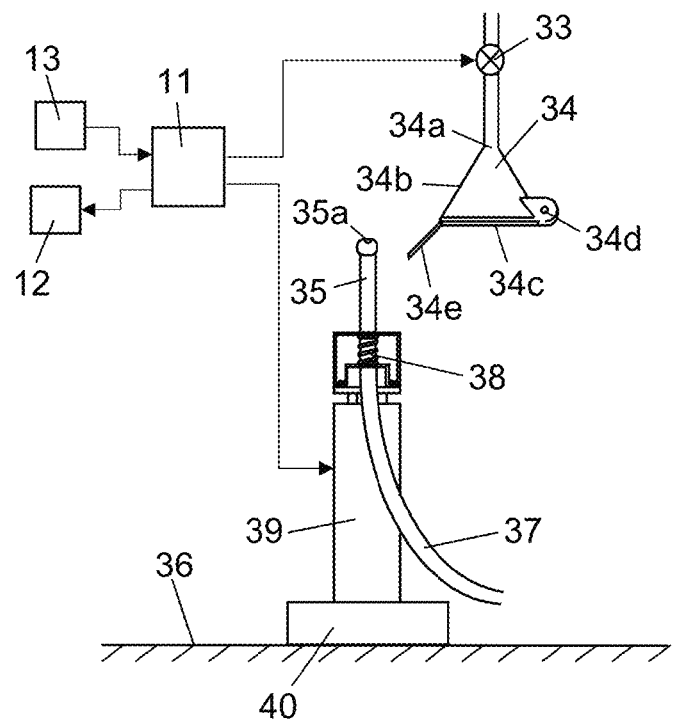
FIG. 3 shows the docking units in FIG. 2 more in detail.

FIG. 3 shows in more detail the docking units 34, 35 when the milking stall 3 approaches the specific rotary position. The funnel-shaped docking unit 34 has an outlet opening 34a where the milk leaves the first milk line. The funnel-shaped docking unit 34 has an inner conically surface 34b arranged around the outlet opening 34a. The funnel-shaped docking unit 34 comprises a removable cover member 34c. The cover member 34c seals an opening to the inner space of the funnel-shaped docking unit 34. The cover member 34c may be held in a closed position by means of a releasable connection such as a snap connection. The cover member 34c is pivotally arranged around a pivot 34d. The cover member 34c is provided with a contact portion 34e. The contact portion 34e is mounted at a height level such that it comes in contact with the tubular docking unit 35 when the milking stall 3 arrives at the specific rotary position.

Figure 7:
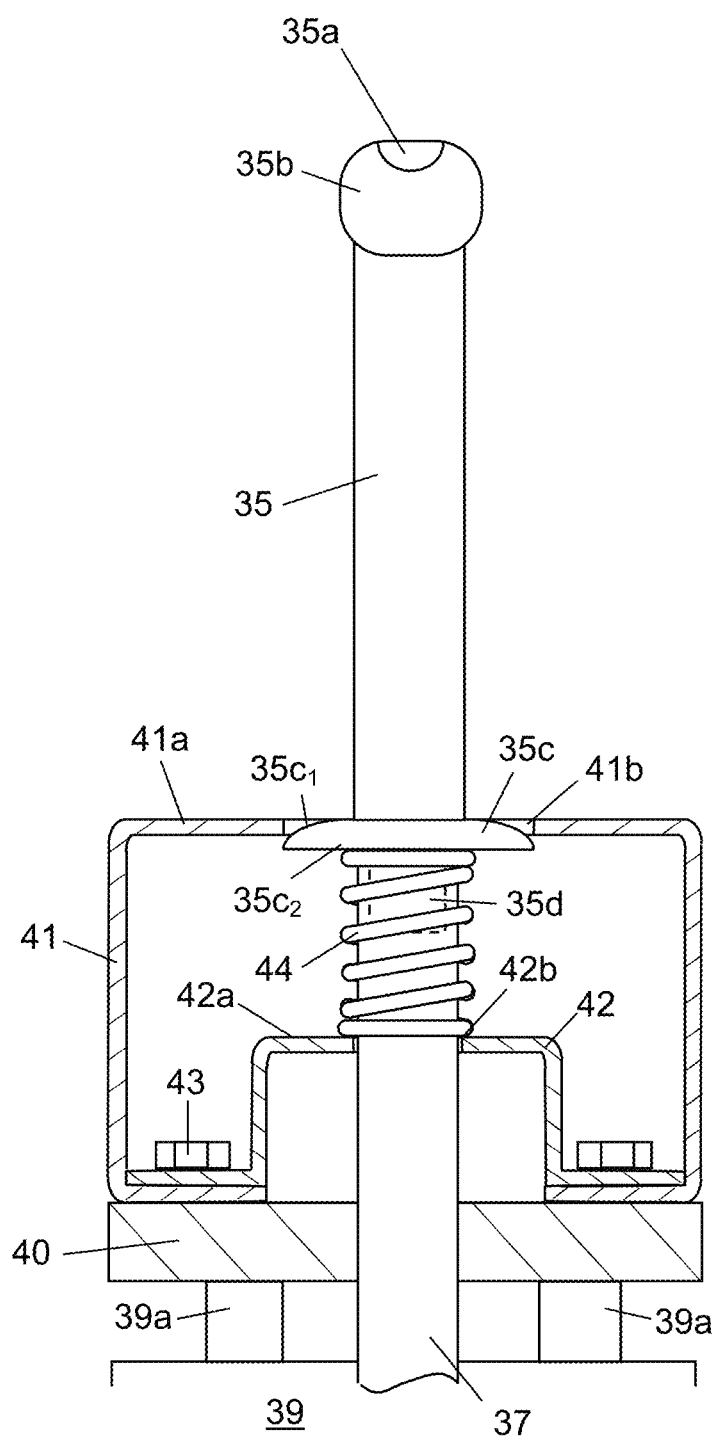

FIG. 7 shows the tubular docking unit 35 more in detail. The tubular docking 35 unit comprises an elongated tubular body. The tubular docking unit 35 comprises an inlet opening 35a at a free end portion 35b. The free end portion 35b has a substantially spherical shape which forms a convex surface around the inlet opening 35a. The tubular docking unit 35 comprises an opposite end portion 35d comprising a connection portion by which the tubular docking unit 35 is connected to the milk line 37. The end portion 35d is indicated with doted lined in FIG. 7. An annular flange 35c is arranged on the tubular docking unit 35 at a small distance from the end portion 35d. An upper surface 35c₁ of the annular flange 35c has a curved convex surface and a lower surface 35c₂ of the annular flange 35c is plane.

The power member 39 comprises two extensible parts 39a. The outer end of extensible parts 39a are connected to a plate member 41. A first larger bracket 41 and a second smaller brackets 42 are mounted on the plate member 41 by means of bolts 43. The first bracket 41 comprises an upper portion 41a provided with a through hole 41b for the tubular docking unit 35. The through hole 41a has a larger diameter than the tubular docking unit except for the annular flange 35b. The second bracket 42 comprises an upper portion 42a provided with a through hole 42b for the milk line 37. The upper portion of the first bracket 41a is arranged at a higher level than the upper portion of the second level 42a. A coil spring 44 is arranged around the milk line 37 and the end portion 35d of the tubular docking unit 35 in a space between the upper portion 41a of the first bracket 41 and the upper portion 42a of the second bracket 42. The coil spring 44 has an upper end connected to the lower surface 35c₂ of the annular flange 35b and a lower end connected to a surface of the upper portion 42a of the second bracket 42.

The brackets 41, 42 and the coil spring 44 provide a resilient mechanism supporting the tubular unit 35. The coil spring 44 holds the tubular docking unit 35 in a substantially vertical direction in an unloaded state. In case the upper end portion 35b of the tubular docking unit 35 is loaded, the tubular docking unit 35 is able to provide pivoting movements in an arbitrary direction. The through hole 41b of the first bracket 41 limits a maximum pivoting movement of the tubular docking unit 35. The curved upper surface 35c₁ of the annular flange 35c enables the pivoting movements of the tubular docking unit 35. The coil spring 44 allows adjusting movements of the upper end portion 35b in a transverse plane and in a longitudinal direction.

Figure 4:
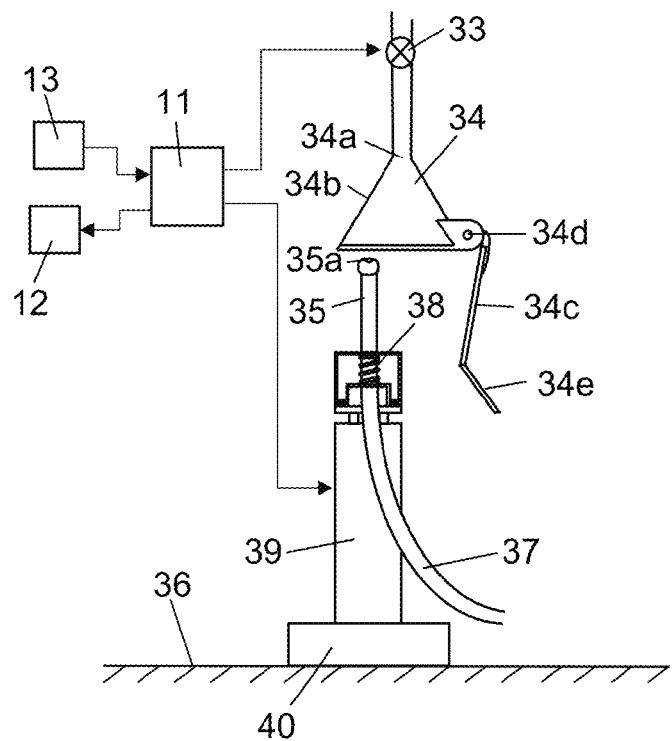
FIG. 4 shows the docking units when the platform has stopped in a specific rotational position for docking.

FIG. 4 shows the milking stall when it has arrived at the specific rotary position. During the last part of the movement to the specific rotary position, the contact portion 34e of the cover member 34c has come in contact with the tubular docking unit 35. The tubular docking unit 35 has pushed the covering member 34c from its closed position to an open position such that an opening to an inner space of the funnel-shaped docking unit 34 has been exposed. The control unit 11 controls the drive mechanism 12 such that the platforms is stopped when the milking stall 3 has arrived at the specific rotary position which in this case corresponds to the last rotational position $p_n$. The platform 2 remains in the standstill position during a period of time when the cow 1 leaves the milking stall 3. The control unit 11 activates the power member 39 such that it moves the tubular docking unit 35 vertically upwardly towards the funnel-shaped docking unit 34.

Figure 5:
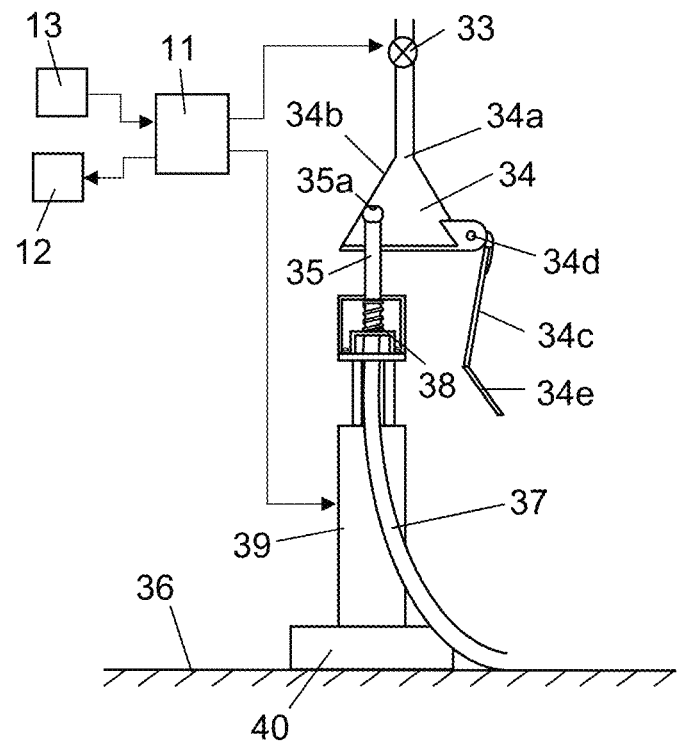
FIG. 5 shows the docking unit in an initial contact position.

FIG. 5 shows when the tubular docking unit 35 has reached an initial contact position with the inner conically shaped surface of the funnel-shaped docking unit 34. During the continued movement of the tubular docking unit upwardly, the conically-shaped inner surface 34b of the funnel-shaped docking unit 34 guides the upper end portion 35a of the tubular docking unit. The upper end portion 35a of the tubular docking unit is successively guided towards a center point of the conically-shaped inner surface 34b of the funnel-shaped docking unit 34 where the outlet opening 34a is located. During this movement, the adjusting mechanism 38 allows a pivoting movement of the tubular docking unit 35.

Figure 6:
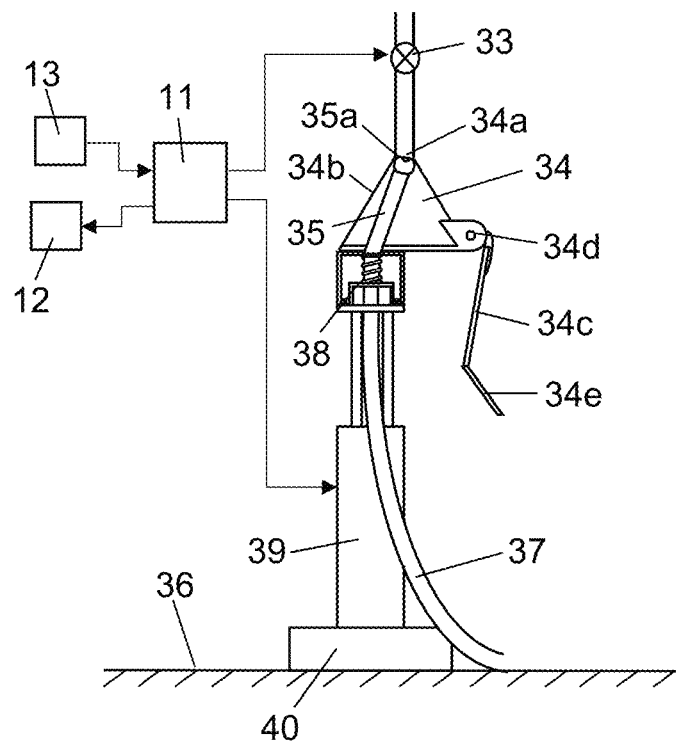
FIG. 6 shows the docking unit in a docking position and FIG. 7 shows one of the docking units more in detail.

FIG. 6 shows when the tubular docking unit 35 has reached the docking position with the funnel-shaped docking unit 34. The inlet opening 35a of the tubular docking unit 35 is here in contact with the outlet opening 34a of the funnel-shaped docking unit 34. The spherical upper end portion 35b of the tubular docking unit 35 abuts tightly against the conically-shaped surface 34b in the vicinity of the outlet opening 34a. The control unit 11 opens the valve member 33 such that the milk in the milk sampling container 31 flows downwardly, via the closed connection between the outlet opening 34a of the funnel-shaped docking unit 34 and the inlet opening 35a of the tubular docking unit 35, to the milk line 37 and the milk sampling apparatus. The filling member of the milk sampling apparatus directs the milk sample into a sampling tube. Thereafter, the control unit 11 controls the power member 39 such that it moves the tubular docking unit downwardly and back to the height level shown in FIG. 3. The transfer of milk from the individual cows 1 in the milking stall 3 on the platform continuous until a milk sample has been taken of all cows 1 in the herd.

In this case, the milk sample is transferred from a milking stall on platform 2 to the milk sampling apparatus arranged separately from the platform 2 when the platform is at standstill. However, it is possible to arrange the power unit 39 on a support member 40 which is slidably arranged on a rail or the like. In this case, it is not necessary to stop the platform during the transfer of milk from the platform to the milk sampling apparatus. In the docking position the support member 40 and associated components will be moved by platform 2. A retracting member may move the support member 40 back to an initial position when the docking process has ceased.

In this case, the tubular docking element 35 has an end portion 35b with a spherically shaped contact surface around the inlet opening 35a and the funnel-shaped docking unit 34 a conically shaped contact surface in the vicinity of the outlet opening 34a. The complementary shape of the contact surfaces allows a tight contact between the contact surfaces of the docking units 34, 35 substantially independent of the inclination of the tubular docking unit 34 in relation the funnel-shaped docking unit 35. In order to further guarantee a closed connection between the openings 34a, 35b, it is possible to provide one of the docking units 34, 35 with a sealing member such as an O-ring in contact with a contact surface of the other docking units 34, 35.

The invention is not limited to the described embodiments but may be varied and modified freely within the scope of the claims.

The invention claimed is:

1. A docking device of a milking parlour in the form of a rotatable, rotary platform (2) with a plurality of milking stalls (3) and a common circular milk line (20) that receives milk from animals milked in the milking stalls (3) the docking device comprising:
   a first milk line (30-34), connected to the rotatable platform (2) configured to receive a milk sample from an animal (1) milked in a milking stall (3), the milk sample received by the first milk line being separate from the milk received by the common circular milk line (20);
   a second milk line (35,37) separate from the rotatable platform (2) and configured to feed the milk sample to a milk sampling apparatus that is also separate from the rotatable platform (2);
   a first docking unit (34) comprising an outlet opening (34a) of the first milk line (30-34); and
   a second docking unit (35) comprising an inlet opening (35a) of the second milk line (35, 37),
   one of the first and second docking units (34, 35) is moveable towards the other of the first and second docking units (34, 35) to reach a docking position when the milking stall (3) on the rotatable platform (2) operationally moves along with the rotatable platform to a predetermined rotary position (pn),
   wherein the one of the first and second docking units (34, 35) comprises an adjusting mechanism (38) that adjusts a position of the one of said first and second docking units (34, 35) in relation to the other of said first and second docking units (34, 35),
   at least one of the first and second docking units (34, 35) being associated with a guiding surface (34b) configured to guide the other of the first and second docking units (34, 35) during movement of the first and second docking units (34, 35) relative to each other in order to reach the docking position in which a closed connection is accomplished between the outlet opening (34a) of the first docking unit (34) and the inlet opening (35a) of the second docking unit (35).

2. The docking device according to claim 1, wherein the first docking unit (34) and the second docking unit (35) comprises complementary shaped contact surfaces (34b, 35b) in the docking position forming the closed connection between the inlet opening (34a) and the outlet opening (35a).

3. The docking device according to claim 1, wherein at least one of the first and second docking units (34, 35) comprises a contact surface with the other docking unit in the docking position formed by a sealing member.

4. The docking device according to claim 1, wherein said movable docking unit (34, 35) is configured to provide a substantially vertical movement towards the other docking unit (34, 35).

5. The docking device according to claim 1, wherein said movable docking unit (34, 35) is configured to provide a movement towards the other docking unit (34, 35) by means of an extensible power member (39).

6. The docking device according to claim 5, wherein said extensible power member (39) is separately mounted in relation to the platform (2).

7. The docking device according to claim 1, wherein said guiding surface comprises a conically shaped surface (34b).

8. The docking device according to claim 7, wherein said docking unit associated with the guiding surface (34b) is a funnel-shaped docking unit (34).

9. The docking device according to claim 1, wherein the docking unit associated with the guiding surface (34b) is associated with the first milk line (30-34).

10. The docking device according to claim 1, wherein the movable one of the first and second docking units is mounted atop a piston thereby to be moved towards the other of the first and second docking units (34, 35), and
   wherein the adjusting mechanism (38) comprises a bracket (42) having a through hole (42b), through which a tubular portion of the one of the first and second docking units (34, 35) extends, the tubular portion configured to pivot about a pivot axis formed by through hole (42b).

11. The docking device according to claim 10, wherein the docking device comprises a spring member (44) coiled around the tubular portion, a first end of the spring member (44) resting against a contact surface (42a) of the bracket (42) at a location of the through hole (42b).

12. The docking device according to claim 11, wherein opposing end of the coil spring (44) is arranged between a contact surface ($35c_2$) of the docking unit (35) and the contact surface (42a).

13. The docking device according to claim 12,
wherein the adjusting mechanism (38) comprises a second bracket (41) with a second through hole (41b) through which the docking unit (35) extends, and
wherein the second through hole (41b) in the first second bracket (41) has a larger diameter than a diameter of the tubular portion of the unit (35).

14. The docking device according to claim 13, wherein the docking unit (35) is provided with an annular flange (35c) having a larger diameter than the second through hole (41b) in the first bracket (41), a second end of the spring resting against a first surface of the annular flange (35c), and an opposing second surface of the annular flange (35c) resting against a perimeter of the second through hole (41b).

15. The docking device according to claim 14, wherein the annular flange (35c) has a curved surface ($35c_1$) to be in contact with the second bracket (41) in the vicinity of the second through hole (41b).

16. The docking device according to claim 12, wherein a free end portion (35b) of the second docking unit (35) is formed with a convex surface in the vicinity of the inlet opening (35a).

17. The docking device according to claim 1, wherein the outlet opening (34a) of said first docking unit (34) is located at a free end portion (34b) of the first docking unit (34).

* * * * *